United States Patent [19]

Boynton et al.

[11] 3,993,221
[45] Nov. 23, 1976

[54] CLOSED SYSTEM CHEMICAL TRANSFER APPARATUS

[75] Inventors: Edgar M. Boynton, Port Hueneme; William H. Roberts, Ventura, both of Calif.

[73] Assignee: Western Farm Service Inc., Oxnard, Calif.

[22] Filed: Oct. 24, 1975

[21] Appl. No.: 625,456

[52] U.S. Cl. ............................. 222/87; 222/148; 239/309; 100/98 R; 100/DIG. 2; 137/240
[51] Int. Cl.² ............................................. B67B 7/24
[58] Field of Search .............. 222/80, 81, 82, 83, 222/83.5, 86, 87, 88, 148, 145, 151, 149, 155; 239/309, 272; 100/98 R, DIG. 2; 137/240; 138/31

[56] References Cited
UNITED STATES PATENTS

| | | | |
|---|---|---|---|
| 2,139,143 | 12/1938 | Wiswell | 100/DIG. 2 |
| 3,139,343 | 6/1964 | Baselt | 222/86 |

Primary Examiner—Robert B. Reeves
Assistant Examiner—H. Grant Skaggs
Attorney, Agent, or Firm—Ralph B. Pastoriza

[57] ABSTRACT

A receiving chamber is provided for receiving and enclosing a container of chemical such as an insecticide. While the container is in the chamber, a punch member perforates through the top and bottom of the container to permit the insecticide therein to transfer out from the bottom of the chamber to a main tank of water for mixing therewith. The resulting mixture is then passed to suitable spray apparatus for spraying the insecticide in agricultural operations. A plunger member coaxially surrounds the punch member and extends through the top of the chamber and can be lowered to crush the container after its contents have been emptied into the main water tank. In addition, the punch member includes an internal passage for passing flushing water into the container prior to crushing of the same so that it is cleaned out. The entire system is closed so that there is no risk of operators becoming contaminated by the insecticide chemical.

5 Claims, 4 Drawing Figures

CLOSED SYSTEM CHEMICAL TRANSFER APPARATUS

This invention relates broadly to a system for transferring chemicals from a container into another area in a manner to avoid contact with personnel involved in the transfer. More particularly, it has to do with an apparatus useful for transferring concentrated chemical insecticide from a container to a main water tank for mixing with the water to provide a spray solution to be used in agricultural operations.

BACKGROUND OF THE INVENTION

Certain types of chemicals are extremely corrosive such as Class I and Class II insecticides. Such chemicals are provided in a concentrated form in a special container and normally are mixed with water to provide a diluted solution for various purposes such as spraying in agricultural operations.

It is necessary to handle the concentrated chemical extremely carefully to avoid contact with the hands of the personnel in transferring the chemical to another container such as a main water tank in the case of insecticides. In fact, the dangers have become so pronounced that special legislation has been proposed setting forth the exact manner and steps necessary to effect a transfer with minimum risk. Not only is it required that the chemical itself not come into contact with operating personnel but after a specific container of the chemical has been emptied, it must be cleaned and disposed of in a manner which will minimize risk of subsequent contact with any remnants of chemical in the container.

BRIEF DESCRIPTION OF THE PRESENT INVENTION

With the foregoing considerations in mind, the present invention contemplates the provision of a closed system chemical transfer apparatus in the form of a physical structure which will permit the transfer of corrosive chemical from a container to another area without exposure of operating personnel to the chemical. In addition, the apparatus incorporates means for cleaning the container after it has been emptied and crushing it to a compact configuration for recycling the container or otherwise disposing of the same.

Essentially, there is provided a receiving chamber for enclosing a container of the chemical in question. Punch means are provided for rupturing the container while it is completely enclosed within the chamber. The chamber itself has outlet means for transferring out from the chamber the chemical. In addition, there is provided a crushing means for crushing the container while in the chamber after it has been emptied of chemical as well as a water flushing means for cleaning out the container while in the chamber after it has been emptied of chemical and before it has been crushed.

The entire system is closed in that there is minimum risk of any physical contact between the corrosive chemical and operating personnel.

BRIEF DESCRIPTION OF THE DRAWINGS

A better understanding of this invention will be had by referring to one embodiment thereof as illustrated in the accompanying drawings in which.

DETAILED DESCRIPTION OF THE PREFERRED EMBODIMENT

Figure 1:
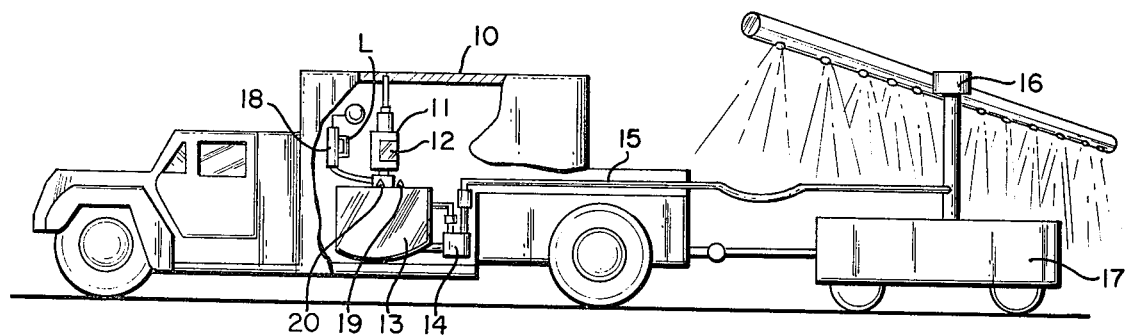
FIG. 1 is a side elevational view of a truck carrying insecticide spraying equipment wherein the closed system chemical transfer apparatus is incorporated illustrative of a specific application of this invention.

Referring to FIG. 1 there is shown for purposes of illustration only one specific application of the present invention to insecticide spraying in agricultural operations. It is to be understood, however, that the closed system chemical transfer apparatus can be used in other applications wherein it is desired to transfer a corrosive chemical with minimum risk to operating personnel.

Thus, in FIG. 1 there is shown an agricultural truck 10 incorporating the transfer apparatus which includes basically a receiving chamber 11 having an access door 12 for receiving and enclosing within the chamber a container of chemical such as insecticide. A main water tank 13 is shown disposed below the chamber 11 and in the particular embodiment described, the arrangement is such that chemical transferred from the chamber 11 to the water tank 13 is mixed with the water in the tank to provide an insecticide spray. This spray is pumped by pump 14 through a hose 15 to suitable spray apparatus 16 carried on a tractor 17.

Also illustrated in FIG. 1 is an auxiliary container 18 connecting into a main on-off outlet valve 19 at the bottom of the chamber 11 through an auxiliary valve 20 upstream of the main on-off valve 19. In certain instances, it may be desirable to provide a controlled amount of the concentrated insecticide to be mixed with water in the main tank 13. Towards this end, the main on-off valve 19 can be closed to block flow of chemical from the chamber 11 to the main water tank 13 and pass this flow of chemical to the auxiliary tank 18. This auxiliary tank 18 may be provided with a liquid level indicator schematically shown at L in FIG. 1. The auxiliary valve 20 can then be closed and the main on-off valve 19 opened. A given amount of the concentrated chemical can then be metered from the auxiliary tank 18 into the main tank 13 by valve 20. It will be appreciated that the foregoing operations take place in a completely closed system so that operating personnel are protected.

Figures 2, 3, 4:
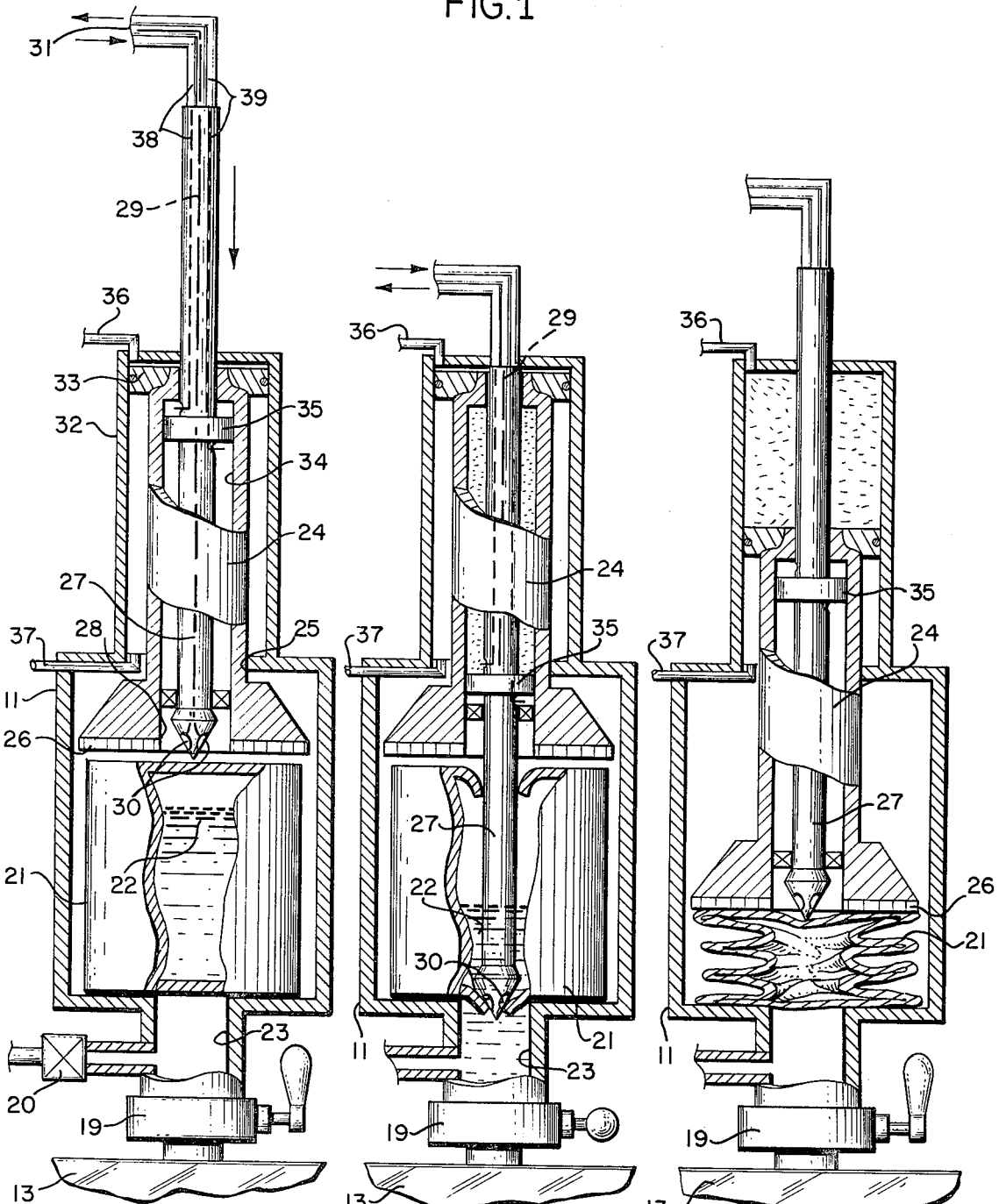
FIG. 2 is an enlarged side elevational view partly broken away of the transfer apparatus itself of FIG. 1 illustrating various components in an initial position preparatory to effecting a transfer of a chemical.
FIG. 3 is a view similar to FIG. 2 but illustrating certain components in a subsequent position during the transfer operation; and, FIG. 4 is still another view similar to FIGS. 2 and 3 but illustrating further different positions of the components during the transfer operation.

Referring now to FIG. 2, details of the transfer apparatus including the receiving chamber 11 described in FIG. 1 will be evident. Referring specifically to the central portion of FIG. 2, there is shown a container 21 positioned wholly within the chamber 11, by means of the access door 12 described in FIG. 1. Container 21 includes a chemical which in the embodiment chosen for illustrative purposes constitutes a concentrated insecticide 22.

Referring to the lower portion of FIG. 2, there is shown an outlet means 23 at the bottom of the chamber 11 which includes the main on-off valve 19 described in FIG. 1 communicating with the main water tank 13.

The auxiliary valve 20 is also schematically illustrated in FIG. 2 upstream of the main on-off valve 19.

Referring now to the upper central portion of FIG. 2, there is shown a hollow plunger member 24 extending down through the top of the chamber 11 as at 25 and terminating within the upper end of the chamber in a crusher platen 26. A punch member 27 in turn is coaxially disposed and movable within the plunger member 24. The lower end of the crusher platen 26 is provided with an opening 28 through which the punch member 27 can extend.

Indicated by the central dashed vertical line on the plunger member 27 is an interior passage 29 extending from the upper end of the plunger member and terminating in at least one outlet opening 30 at its lower end. This passage 29 connects with a suitable inlet conduit 31 which functions as a means for introducing flushing water into the upper end of the interior passage 29. The purpose for this arrangement will be described subsequently.

Still referring to FIG. 2, the main portion of the apparatus is completed by an outer cylinder 32 mounted above the chamber 11 and surrounding the plunger member 24. The exterior wall of the plunger member 24 includes a piston 33 reciprocable with the plunger member in the outer cylinder 32. The interior of the plunger member defines an inner cylinder 34 surrounding the punch member 27, the punch member 27 similarly including a piston 35 reciprocable with the punch member in the inner cylinder.

With the foregoing arrangement, it is possible to lower and raise both the plunger member 24 and punch member 27 hydraulically and towards this end, there are provided hydraulic passages 36 and 37 at the upper and lower ends of the outer cylinder 32 respectively so as to enable the introduction of hydraulic fluid on either side of the piston 33 to thereby actuate and move the plunger member 24 in an up or down direction. Similarly, there are provided hydraulic passages 38 and 39 internally of the punch member 27 opening out respectively above and below the punch member piston 35. Introduction of hydraulic fluid into one or the other of these passages 38 and 39 will cause lowering or raising of the punch member 27.

By way of example, FIG. 3 illustrates the effect of lowering the punch member 27 wherein it will be evident that such action pierces the top and bottom of the container 21 thereby permitting the chemical therein to pass from the chamber 11 through an outlet means 23.

FIG. 4 illustrates the effect of moving the plunger member 24 wherein it will be noted that such action causes the platen 26 to crush the container 21.

OPERATION

In operation, a container of concentrated chemical such as insecticide is positioned in the chamber 11 as shown at 21 in FIG. 2, the plunger member 24 and punch member 27 being in their raised positions. Placing of the container 21 in the chamber is accomplished through the access door 11 illustrated in FIG. 1, this access door being closed so that the container is completely surrounded by the chamber 11.

After the container 21 has been properly positioned in the chamber 11, the main on-off outlet valve 19 shown in FIG. 2 is opened to provide communication between the outlet means 23 at the bottom of the chamber and the main water tank 13. The auxiliary valve 20 is closed assuming that the container 21 incorporates the correct amount of chemical to be mixed with water in the main tank.

Hydraulic fluid is now introduced into the passage 38 of the punch member 27 thereby flowing out into the inner cylinder 34 above the piston 35 to urge the punch member 27 downwardly so that the same will pierce through both the top and bottom of the container 21 as illustrated in FIG. 3. The chemical 22 will now flow through the outlet means 23 and valve 19 into the main tank 13 to empty the container 21, partial emptying thereof being illustrated in FIG. 3.

After the container 21 is emptied of chemical, water is introduced into the interior passage 29 to pass down through the punch member 27 and out of the lower opening 30 and as this flushing water is forced through the interior passage, hydraulic fluid is simultaneously introduced into the interior passage 39 of the punch member 27 to flow out under the piston 35 and slowly raise the punch member. The inside of the container 21 is thus sprayed with water as the punch member 27 is withdrawn thereby thoroughly cleaning the interior of the container 21. This flushing water will simply drain out the pierced bottom of the container and through the outlet means 23 and main on-off valve 19 to the main water tank 13.

After the flushing operation has been completed and the punch member 27 retracted upwardly to the position illustrated in FIG. 2, hydraulic fluid is then introduced into the hydraulic passage 36 thereby forcing the plunger member 24 downwardly as illustrated in FIG. 4. The punch member 27 will be carried downwardly with the plunger member 24, the platen 26 crushing the container 21. The main on-off valve 19 may be closed during this crushing operation.

After the container 21 is completely crushed, the plunger member 24 and punch member 27 are both retracted to their initial positions illustrated in FIG. 2 and the crushed container 21 then manually removed through the access door 12 of FIG. 1 and may be recycled or otherwise disposed of.

In the event that only a given amount of chemical insecticide is to be mixed with water in the main tank 13, it is desirable to provide means for metering the amount of chemical to be transferred. It is for this purpose that the auxiliary container 18 and auxiliary valve 20 described in conjunction with FIG. 1 are provided. Thus, in such instance where a metered amount of insecticide is to be transferred, the normal container 21 is positioned in the chamber 11 as shown in FIG. 2 but the main on-off valve 19 is closed and the auxiliary valve 20 opened.

The container is then emptied following through the various steps described to transfer the chemical insecticide the chemical itself passing through the auxiliary valve 20 to the auxiliary container 18. In this respect, where the container 18 is disposed above the bottom of the chamber 11, a vacuum is drawn on the upper portion of the container to draw in the insecticide.

When the container 21 is completely emptied, its total contents will be in the auxiliary container 18. The container 21 is washed and crushed in the same manner as described heretofore and removed from the chamber 11. It is now possible by simply opening the auxiliary valve 20 and the main on-off valve 19 to permit a controlled amount of the insecticide from the auxiliary tank 18 to flow into the main tank 13. Towards this end, the level of liquid indicator L described in FIG. 1 for the auxiliary tank 18 can be observed so that the desired amount of chemical can be properly metered by controlling the auxiliary valve 20.

It will be understood in the specific application set forth that after the chemical has been mixed with the water in the main tank, the insecticide mixed solution will then be pumped to the spray apparatus all as described in FIG. 1.

From the foregoing, it will be evident that the present invention has provided a unique and useful closed system chemical transfer apparatus which minimizes the risk of human contact with corrosive chemicals in containers during a transfer operation.

What is claimed is:

1. A closed system chemical transfer apparatus including, in combination:
   a. a receiving chamber having an access door for receiving and enclosing within said chamber a container of chemicals;
   b. an outlet means communicating with the bottom of said chamber;
   c. a hollow plunger member extending down through the top of said chamber and terminating within the upper end of said chamber in a crusher platen; and,
   d. a punch member coaxially disposed and movable within said plunger member, the lower end of said crusher platen having an opening through which said punch member can extend whereby a container of chemical may be enclosed in said chamber and said punch member lowered to pierce through the top and bottom of said container to permit chemical in said container to transfer from said chamber through said outlet means and whereby after said container is empty, said plunger can be lowered to cause said platen to crush said container into a compact configuration for subsequent removal from said chamber by raising said punch member and plunger member and opening said access door.

2. An apparatus according to claim 1, in which said punch member includes an interior passage extending from its upper end and terminating in at least one outlet opening at its lower end; and means for introducing flushing water into the upper end of said interior passage after a container has been emptied of its chemical and before the container has been crushed, said water passing out said outlet opening in said punch member to spray the inside of the container to clean the same.

3. An apparatus according to claim 1, including an outer cylinder mounted above said chamber and surrounding said plunger member, said plunger member having a piston reciprocable with said plunger member in said outer cylinder, the interior of said plunger member defining an inner cylinder surrounding said punch member, said punch member having a piston reciprocable with said punch member in said inner cylinder; and hydraulic passage means communicating with the interiors of the outer and inner cylinders on either side of the pistons therein whereby lowering and raising of the punch member and plunger member can be hydraulically controlled.

4. An apparatus according to claim 1, in which said outlet means includes a main on-off valve for passing and blocking transfer of chemical from said chamber; an auxiliary valve upstream of said main on-off valve; and an auxiliary container disposed exterior of said chamber communicating with said auxiliary valve whereby when said main on-off valve is closed and said auxiliary valve is open, chemical may be transferred and temporarily stored in said auxiliary container for subsequent transfer through said main on-off valve upon opening of the same, said auxiliary container having chemical level indicating means so that a metered amount of said chemical can be transferred by proper control of said auxiliary valve.

5. An apparatus according to claim 1, in which said outlet means includes a main on-off valve; and a main water tank connected to said outlet means so as to be in communication with said chamber when said main on-off outlet valve is opened, said chemical comprising a concentrated insecticide whereby said insecticide may be transferred to said main tank for mixing with water therein to provide an insecticide spray solution for agricultural purposes.

* * * * *